United States Patent [19]

Bell et al.

[11] 3,714,145

[45] Jan. 30, 1973

[54] 1,4-BENZODIAZEPINE-2-ONES AND INTERMEDIATES

[75] Inventors: Stanley C. Bell, Philadelphia; Scott J. Childress, Newtown Square, both of Pa.

[73] Assignee: American Home Products Corporation, New York, N.Y.

[22] Filed: Feb. 6, 1961

[21] Appl. No.: 87,102

[52] U.S. Cl..260/239.3 D, 260/251 Q, 260/329 AM, 260/332.2 R, 260/332.3 C, 260/332.5, 260/570 AB, 260/562 B, 260/566 A, 424/244, 424/275, 260/378
[51] Int. Cl. ............................................C07d 53/06
[58] Field of Search................260/259, 239.3 D, 251 Q, 329 AM, 260/332.2 R, 332.3 C, 332.5

[56] References Cited

UNITED STATES PATENTS

| | | | |
|---|---|---|---|
| 2,893,992 | 7/1959 | Sternbach | 260/239 |
| 3,267,110 | 8/1966 | Pachter et al. | 260/296 |
| 3,270,058 | 8/1966 | Reeder et al. | 260/562 |
| 3,336,295 | 8/1967 | Sternbach et al. | 260/239.3 |
| 3,338,886 | 8/1967 | Berger et al. | 260/239.3 |
| 3,371,085 | 2/1969 | Reeder et al. | 260/239.3 |

OTHER PUBLICATIONS

Yale "J. Med. Pharm. Chem" Vol. 1, pages 121–133 (1959)

*Primary Examiner*—Henry R. Jiles
*Assistant Examiner*—Robert T. Bond
*Attorney*—Marston L. Hamlin, Louis H. Baer and Dwight J. Potter

[57] ABSTRACT

This invention relates to certain 1,4-benzodiazepine-2-ones and intermediates for their preparation. The 1,4-benzodiazepine-2-ones are useful as sedatives, anticonvulsants, analgesics and tranquilizers.

11 Claims, No Drawings

1,4-BENZODIAZEPINE-2-ONES AND INTERMEDIATES

This invention relates to novel cyclic amides of the benzodiazepine series and to processes and intermediates useful in the preparation of these. More particularly, it relates to novel 1,4-benzodiazepine-2-ones and intermediates therefor.

The 1,4-benzodiazepine-2-ones of this invention are valuable on account of their unusual pharmacological properties. They are central nervous system depressants and are useful as sedatives. A large number of them are additionally effective as anticonvulsants, and certain of them are effective as analgesics and tranquilizers. Because of these valuable properties, the relatively slight toxicity of these compounds, and the very low incidence of side-effects attending their use, these products are of value in both veterinary and human medicine.

The pharmacologically valuable compounds of this invention may be administered either parenterally or orally either as the bases or as the medicinally acceptable salts thereof, such as the hydrochlorides, hydrobromides, sulfates, etc. When intended for oral administration, they may be combined with conventional fillers, excipients, adhesives, mold lubricants, coloring and flavoring materials and formed into pills, tablets, lozenges, etc., to provide convenient dosage forms.

The novel 1,4-benzodiazepine-2-ones of this invention may be represented by the formula I

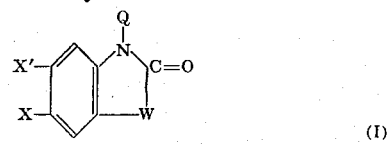

(I)

where Q represents hydrogen or lower alkyl, X and X' each represents a member of the group consisting of H, Cl, $CH_3$, and Br, and W represents a bivalent radical selected from the group consisting of

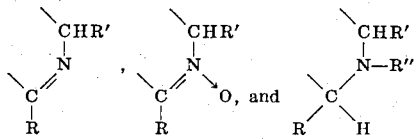

wherein R' represents hydrogen, lower alkyl, or phenyl and R represents methyl, phenyl, α-thienyl, cyclohexyl, methoxyphenyl, halophenyl, benzyl, or nitrophenyl, and R'' is hydrogen or lower alkyl. Thus, it will be seen that in respect to the bivalent radical W, the 1,4-benzodiazepine-2-ones of this invention may be conveniently grouped into three subgenera representable by the formulas II, III, and IV, in which Q, X, X', R, R', and R'' have the meanings above recited.

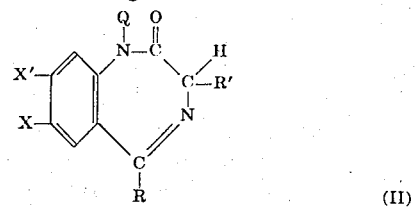

(II)

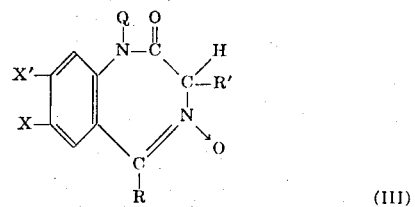

(III)

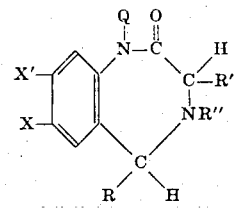

(IV)

The 1,3-dihydro-2H-1,4-benzodiazepine-2-ones corresponding to formula II may be converted to 4-oxides corresponding to formula III by oxidation with a peroxide, e.g., peracetic acid. The 1,3-dihydro-2H-1,4-benzodiazepine-2-one-4-oxides corresponding to formula III may be converted to 1,3-dihydro-2H-1,4-benzodiazepine-2-ones corresponding to formula II by palladium-catalyzed hydrogenation, as well as by reduction with a phosphorus trihalide, such as phosphorus trichloride. The compounds of formula II may be converted to 1,3,4,5-tetrahydro-2H-1,4-benzodiazepine-2-ones (formula IV, R''=H) by further hydrogenation catalyzed by palladium. 4-Alkyl-1,3,4,5-tetrahydro-1H-1,4-benzodiazepine-2-ones (formula IV, R''=alkyl) may be made by reducing a quaternization product of a material of formula II with sodium borohydride.

In view of the above interconversions between the 4-oxides (formula III) and the 4-desoxy compounds (formula II) and the easy conversion of either to the formula IV compounds, it is obvious that synthesis of either a formula II compound or a formula II compound amounts to a synthesis of all three types. We have found convenient synthetic methods of general utility for preparing the 1,4-benzodiazepine-2-ones of this invention, which are illustrated schematically as follows:

Method A

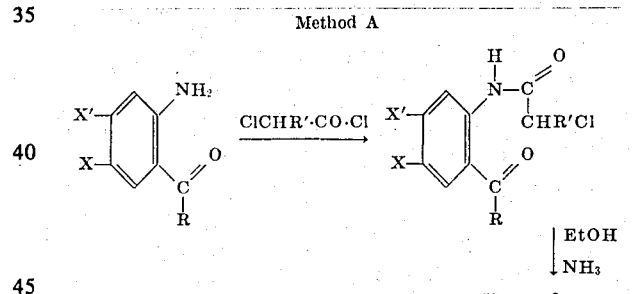

Method B

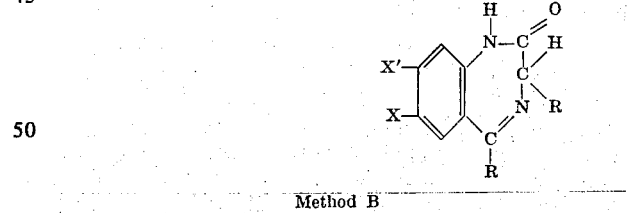

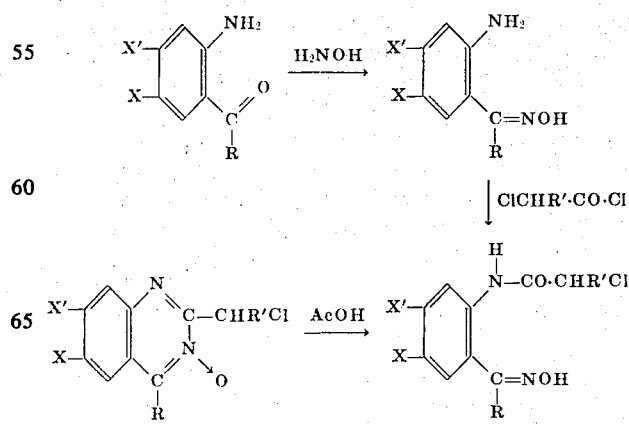

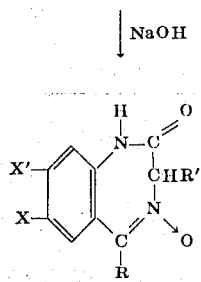

In Method A, a 2-aminophenyl ketone, which may be substituted at positions 4 and/or 5 is acylated with an α-chloroacyl chloride, to yield 2-(α-chloroacylamino)phenyl ketone, which, when treated with alcoholic ammonia, surprisingly undergoes a ring closure reaction to yield a 1,3-dihydro-2H-1,4-benzodiazepine-2-one.

In Method B, a 2-aminophenyl ketone is first condensed with hydroxylamine to yield its corresponding oxime. This aminophenyl ketone oxime is then chloroacylated with a suitable α-chloroacyl chloride, such as chloroacetyl chloride or α-chloropropionyl chloride, to form the corresponding haloacylamino oxime, which readily undergoes ring closure under acid conditions to form a 2-(α-haloalkyl)-quinazoline-3-oxide. We have, to our surprise, found that treatment of such a 2-(α-haloalkyl)-quinazoline-3-oxide with a strong base (e.g., sodium hydroxide in alcohol) results in ring-enlargement with the formation of a 1,3-dihydro-2H-1,4-benzodiazepine-2-one-4-oxide.

1,4-Benzodiazepine-2-ones of this invention having a lower alkyl substituent at position 1 (e.g., formula III, Q = lower alkyl) may be prepared by alkylation of the corresponding compounds having hydrogen at this position. Thus, for example, 7-chloro-1,3-dihydro-1-methyl-5-phenyl-2H-1,4-benzodiazepine 2-one-4-oxide may be prepared by stirring 7-chloro-1,3-dihydro-5-phenyl-2H-1,4-benzodiazepine-2-one-4oxide with dimethyl sulfate and aqueous sodium hydroxide.

Instead of the α-chloroacyl chlorides shown above as used in both Methods A and B, we may employ any other convenient haloacyl halide. Thus, instead of chloroacetyl chloride we could equally well use bromoacetyl chloride, bromoacetyl bromide, or chloroacetyl bromide. Example 8, below, as a matter of fact, shows the use of α-bromopropionyl bromide in the acylation step of a Method A process.

The following examples will serve to illustrate the practice of our invention.

EXAMPLE 1

To a solution of 23 g. of 2-amino-5-chlorobenzophenone in 100 ml. of chloroform is added with stirring at room temperature 8.5 ml. of chloroacetyl chloride in 50 ml. of chloroform. After 1 hour the solvent is removed in vacuo and the residue recrystallized from alcohol giving 5-chloro-2-(α-chloroacetylamino) benzophenone.

Anal. Calcd. for $C_{15}H_{11}Cl_2NO_2$: C, 58.45; H, 3.60; N, 4.54; Cl, 23.01

Found: C, 58.09; H, 3.30; N, 4.49; Cl, 22.72

To 125 ml. of absolute ethanol saturated with ammonia is added with stirring 5.0 g. of 5-chloro-2-(α-chloroacetylamino) benzophenone and a trace of sodium iodide. After standing for two days, during which time the solid dissolves, the solvent is removed in vacuo and water added to the residue. The resultant solid is collected and extracted with dilute hydrochloric acid. The acid solution is then neutralized with ammonium hydroxide and 7-chloro-1,3-dihydro-5-phenyl-2H-1,4-benzodiazepine-2-one collected and recrystallized from ethanol, m.p. 214°–216°.

Anal. Calcd. for $C_{15}H_{11}ClN_2O$: C, 66.55; H, 4.10; N, 10.35; Cl, 13.10

Found: C, 66.45; H, 4.03; N, 10.55; Cl, 13.12

This compound is soluble in warm propylene glycol and absorbs strongly in the infrared at 5.93μ.

EXAMPLE 2

To a solution of 20 g. of sodium hydroxide in 300 ml. of absolute ethanol is added with stirring 15 g. of 2-chloromethyl-6-chloro-4-phenyl quinazoline-3-oxide. After stirring for one-half hour, the reaction mixture is diluted with 300 ml. of water and the solution acidified with dilute hydrochloric acid. 7-Chloro-1,3-dihydro-5-phenyl-2H-1,4-benzodiazepine-2-one-4-oxide is collected and recrystallized from ethanol, m.p. 238°–9°.

Anal. Calcd. for $C_{15}H_{11}ClN_2O_2$: C, 62.81; H, 3.84; N, 9.77

Found: C, 63.01; H, 4.09; N, 9.83

This compound is soluble in warm propylene glycol and absorbs at 5.87μ.

In the same manner, 7,8-dichloro-1,3-dihydro-5-phenyl-2H-1,4-benzodiazepine-2-one-4-oxide may be prepared from 2-chloromethyl-6,7-dichloro-4-phenyl quinazoline-3-oxide.

EXAMPLE 3

One gram of 7-chloro-1,3-dihydro-5-phenyl-2H-1,4-benzodiazepine-2-one is dissolved in a solution of 25 ml. of glacial acetic acid containing 0.38 g. of peracetic acid. After standing for 24 hours at room temperature, the reaction mixture is diluted with 200 ml. of water and neutralized with sodium carbonate. The 7-chloro-1,3-dihydro-5-phenyl-2H-1,4-benzodiazepine-2-one-4-oxide is filtered and recrystallized from ethanol to give white plates, m.p. 238°–9°.

EXAMPLE 4

A suspension of 11.0 g. of 7-chloro-1,3-dihydro-5-phenyl-2H-1,4-benzodiazepine-2-one-4-oxide in 300 ml. of alcohol, 50 ml. of water and 7 ml. of 6 N hydrochloric acid is hydrogenated in the presence of 3.0 g. of 5 percent palladium on carbon. After the uptake of one mole of hydrogen the solution is filtered from the catalyst and evaporated to dryness. Alcohol is added to the residue and 7-chloro-1,3-dihydro-5-phenyl-2H-1,4-benzodiazepine-2-one hydrochloride collected and recrystallized from ethanol, m.p. 251°–2°.

Anal. Calcd. for $C_{15}H_{12}Cl_2N_2O$: C, 58.67; H, 3.94; N, 9.12

Found: C, 58.64; H, 4.22; N, 8.73

The conversion to the free base, 7-chloro-1,3-dihydro-5-phenyl-2H-1,4-benzodiazepine-2-one, is accomplished by dissolving the hydrochloride salt in water and precipitating the product out with sodium carbonate solution. Recrystallization from ethanol gives the compound melting at 214°–216° which is the same as the compound prepared in Example 1.

The methiodide is prepared from methyl iodide in acetone, m.p. 250°–1°.

Anal. Calcd. for $C_{16}H_{14}ClIN_2O$: C, 46.56; H, 3.43
Found: C, 46.32; H, 3.37

EXAMPLE 5

A suspension of 2.89 g. of 7-chloro-1,3-dihydro-5-phenyl-2H-1,4-benzodiazepine-2-one-4-oxide in 100 ml. of ethanol, 15 ml. of water and 2 ml. of 6 N hydrochloric acid is reduced in the presence of 1.5 g. of 5 percent palladium on carbon until the uptake of 2 moles of hydrogen. The solution is filtered from the catalyst and evaporated to dryness in vacuo. Acetonitrile is added to the residue and the hydrochloride salt collected and recrystallized from acetonitrile, m.p. 251°–3°. The hydrochloride salt is converted to the free base and recrystallized from cyclohexane, giving 1,3-dihydro-5-phenyl-2H-1,4-benzodiazepine-2-one, m.p, 178°–180°.

Anal Calcd. for $C_{15}H_{12}N_2O$: C, 76.24; H, 5.11; N, 11.86
Found: C, 76.01; H, 5.07; N, 11.60

EXAMPLE 6

To a solution of 15 g. of sodium hydroxide in 300 ml. of absolute ethanol is added with stirring 8.5 g. of 2-chloromethyl-4-phenyl quinazoline-3-oxide. After one-half hour 400 ml. of water is added. The product is precipitated out by the addition of hydrochloric acid. There is obtained 1,3-dihydro-5-phenyl-2H-1,4-benzodiazepine-2-one-4-oxide, m.p. 250°.

Anal. Calcd. for $C_{15}H_{12}N_2O_2$: C, 71.40; H, 4.80; N, 11.11
Found: C, 71.05; H, 4.79; N, 11.36

EXAMPLE 7

A suspension of 2.52 g. of 1,3-dihydro-5-phenyl-2H-1,4-benzodiazepine-2-one-4-oxide in 100 ml. of alcohol, 20 ml. of water and 2 ml. of 6 N hydrochloric acid is reduced in the presence of 1.0 g. of palladium on carbon until the uptake of 1 mole of hydrogen. The solution is filtered from the catalyst and evaporated to dryness in vacuo. Acetonitrile is added to the residue and the hydrochloride salt collected, dissolved in water and the free base precipitated out by the addition of sodium carbonate solution. Recrystallization from benzene gives 1,3-dihydro-5-phenyl-2H-1,4-benzodiazepine-2-one, m.p. 179°–180°. This compound is the same as that prepared in Example 5.

EXAMPLE 8

To a solution of 11.3 g. of 2-amino-5-chlorobenzophenone in 100 ml. of chloroform is added with stirring a solution of 12 g. of α-bromo-propionyl bromide in chloroform. After one-half hour the solvent is evaporated in vacuo and the residue extracted from impurities with ether. Evaporation of the ether gives 5-chloro-2-(α-bromopropionylamino)benzophenone which is recrystallized from methanol, m.p. 113°–114°.

Anal. Calcd. for $C_{16}H_{13}BrClNO_2$: C, 52.44; H, 3.57; N, 3.82;
Cl, 9.67; Br, 21.80
Found: C, 52.44; H, 3.52; N, 3.70; Cl, 9.53; Br, 21.47

To 200 ml. of alcohol saturated with ammonia is added with stirring 9.0 g. of 5-chloro-2-(α-bromopropionylamino)benzophenone and a trace of sodium iodide. After 24 hours the solvent is removed in vacuo and water added to the residue. The solid free base is collected and converted to the hydrochloride salt in ethanol, m.p. 294°–5°. The hydrochloride salt is converted to the free base, 7-chloro-1,3-dihydro-3-methyl-5-phenyl-2H-1,4-benzodiazepine-2-one, m.p. 220°–1.

Anal. for $C_{16}H_{13}ClN_2O$: Calcd. C, 67.33; H, 4.60; N, 9.84; Cl, 12.45
Found: C, 67.37; H, 4.62; N, 9.90; Cl, 12.60

EXAMPLE 9

1,3-Dihydro-7-methyl-5-phenyl-2H-1,4-benzodiazepine-2-one-4-oxide, m.p. 235°–236°, is prepared following the method of Example 2.

Anal. Calcd. for $C_{16}H_{14}N_2O_2$: C, 72.16; H, 5.30; N, 10.52
Found: C, 71.92; H, 5.37; N, 10.67

EXAMPLE 10

A. The addition of a solution of 32.6 g. of 2-bromothiophene in 200 ml. of ether to 4.86 g. of magnesium gives 2-thienyl magnesium bromide. This is then added with stirring to a chilled suspension of 39 g. of 6-chloroacetanthranil (prepared by heating 5-chloroanthranilic acid with acetic anhydride) in 300 ml. of benzene. After warming to 35° the reaction mixture is decomposed with dilute hydrochloric acid. The organic layer is washed with water and dilute sodium hydroxide solution, concentrated to a small volume and the product obtained by addition of hexane. The 2-acetylamino-5-chlorophenyl-2-thienyl ketone is recrystallized from ethanol and has a melting point of 112°–113°C.

Anal. Calcd. for $C_{13}H_{10}ClNO_2S$: C, 55.80; H, 3.60; Cl, 12.67;
N, 5.01; S, 11.46
Found: C, 55.96; H, 3.63; Cl, 12.76; N, 5.03; S, 11.40

B. A solution of 20 g. of 2-acetylamino-5-chlorophenyl-2-thienyl ketone, 50 ml. of concentrated hydrochloric acid and 200 ml. of ethanol is refluxed for 1½ hours. After cooling, the 2-amino-5-chlorophenyl-2-thienyl ketone is precipitated by the addition of 300 ml. of water, and then recrystallized from cyclohexane as yellow needles, m.p. 95°–6°.

Anal. Calcd. for $C_{11}H_8ClNOS$: C, 55.57; H, 3.39; N, 5.89;
Cl, 14.92; S, 13.49
Found: C, 55.34; H, 3.38; N, 5.96; Cl, 14.72; S, 13.47

C. A solution of 16.0 g. of 2-amino-5-chlorophenyl 2-thienyl ketone, 16.0 g. of hydroxylamine hydrochloride, and 75 ml. of pyridine is refluxed for 5 hours and then concentrated in vacuo to dryness. The residue is dissolved in ether, washed with water and the ether evaporated to give the product. The 2-amino-5-chlorophenyl-2'-thienyl ketone oxime is recrystallized from carbon tetrachloride and has a melting point of 140°–1C.

Anal. Calcd. for $C_{11}H_9ClN_2OS$: C, 52.26; H, 3.59; N, 11.09;
Cl, 14.03
Found: C, 52.14; H, 3.42; N, 10.94; Cl, 14.20

D. 6-Chloro-2-chloromethyl-4-(2-thienyl)quinazoline-3-oxide, m.p. 159°–160°, is made according to the preparation of the quinazoline in Example 12.

Anal. Calcd. for $C_{13}H_8Cl_2N_2OS$: C, 50.17; H, 2.59; N, 9.01;
Cl, 22.78
Found: C, 50.53; H, 2.78; N, 9.13; Cl, 22.4

E. 7-Chloro-1,3-dihydro-5-(2-thienyl)-2H-1,4-benzodiazepine-2-one-4-oxide, m.p. 255°–256°, is made by the procedure of Example 2.

Anal. Calcd for $C_{13}H_{19}ClN_2S$: C, 53.35; H, 3.10; Cl, 12.12;
N, 9.57; S, 10.95
Found: C, 53.66; H, 3.20; Cl, 12.20; N, 9.09; S, 10.56

EXAMPLE 11

1,3-Dihydro-7-methyl-5-phenyl-2H-1,4-benzodiazepine-2-one is prepared by catalytic reduction (as described in Example 4) of 1,3-dihydro-7-methyl-5-phenyl-2H-1,4-benzodiazepine-2-one-4-oxide. The m.p. is 204°–6°.

Anal. Calcd. for $C_{16}H_{14}N_2O$: C, 76.77; H, 5.64; N, 11.19
Found: C, 76.99; H, 5.62; N, 11.05

EXAMPLE 12

A solution of 4.5 g. of 2-aminoacetophenone oxime in 50 ml. of glacial acetic acid is treated with 5 ml. of chloroacetyl chloride resulting in a thick precipitate which dissolves on stirring. The solvent is removed in vacuo and the 2-chloromethyl-4-methyl-quinazoline-3-oxide recrystallized from ethanol. The m.p. is 169°–170°.

Anal. Calcd. for $C_{10}H_9ClN_2O$: C, 57.54; H, 4.35; N, 13.45;
Cl, 16.99
Found: C, 57.75; H, 4.50; N, 13.39; Cl, 17.30

To a solution of 5.0 g. of sodium hydroxide in 100 ml. of ethanol is added 3.7 g. of 2-chloromethyl-4-methyl-quinazoline-3-oxide. After one-half hour, the reaction mixture is acidified with dilute hydrochloric acid, evaporated to dryness in vacuo and the product extracted from the inorganic salts with hot ethanol. Evaporation of the alcohol leaves the 1,3-dihydro-5-methyl-2H-1,4-benzodiazepine-2-one-4-oxide, which after recrystallization from water, has a melting point of 235°–6°C.

Anal. Calcd. for $C_{10}H_{10}N_2O_2$: C, 63.15; H, 5.29; N, 14.73
Found: C, 63.20; H, 5.19; N, 14.61

EXAMPLE 13

1,3-Dihydro-5-methyl-2H-1,4-benzodiazepine-2-one hydrochloride, m.p. 285°–6°, is prepared by catalytic reduction, (as in Example 4), of 1,3-dihydro-5-methyl-2H-1,4-benzodiazepine-2-one-4-oxide.

Anal. Calcd. for $C_{10}H_{11}ClN_2O$: C, 57.01; H, 5.27; Cl, 16.83
Found: C, 56.55; H, 5.87; Cl, 16.43

EXAMPLE 14

To a yellow solution of 3.0 g. of 7-chloro-1,3-dihydro-5-phenyl-2H-1,4-benzodiazepine-2-one methiodide (this compound is described in Example 4) in 300 ml. of water is added dropwise a solution of sodium borohydride in water. There ensues an immediate vigorous reaction accompanied by the precipitation of a white solid. The sodium borohydride solution is added until no more color remains and the resultant product is filtered and recrystallized from cyclohexane and then alcohol to give white crystals of 7-chloro-1,3,4,5-tetrahydro-4-methyl-5-phenyl-2H-1,4-benzodiazepine-2-one, m.p. 206°–208°.

Anal. Calcd. for $C_{16}H_{15}ClN_2O$: C, 67.00; H, 5.27; N, 9.77
Found: C, 67.25; H, 5.25; N, 9.85

EXAMPLE 15

2-Acetylamino-5-chlorophenylcyclohexyl ketone, m.p. 113°–115°, is prepared according to Example 10 A.

Anal. Calcd. for $C_{15}H_{18}ClNO_2$: C, 64.38; H, 6.48; N, 5.01
Cl, 12.67
Found: C, 64.29; H, 6.35; N, 5.07; Cl, 12.72

2-Amino-5-chlorophenylcyclohexyl ketone, m.p. 116°–117°, is prepared according to Example 10 B.

Anal. Calcd. for $C_{13}H_{16}ClNO$: C, 65.68; H, 6.79; N, 5.89
Found: C, 65.72; H, 6.51; N, 5.97

5-Chloro-2-(α-chloroacetylamino)phenylcyclohexyl ketone, m.p. 116°–118°, is prepared according to Example 1.

Anal. Calcd. for $C_{15}H_{17}ClNO_2$: C, 57.32; H, 5.45; N, 4.46;
Cl, 22.56
Found: C, 57.51; H, 5.49; N, 4.20; Cl, 22.48

7-Chloro-5-cyclohexyl-1,3-dihydro-2H-1,4-benzodiazepine-2-one, m.p. 200°–202°, is synthesized in accordance with the procedure of Example 1.

Anal. Calcd. for $C_{15}H_{17}ClN_2O$: C, 65.03: H, 6.19; N, 10.13
Found: C, 64.92; H, 6.08; N, 10.26

EXAMPLE 16

5-Chloro-2-(α-chloracetylamino)-4'-methoxybenzophenone, m.p. 138°–140°, is prepared according to Example 1.

Anal. Calcd. for $C_{16}H_{13}Cl_2NO_3$: C, 56.83; H, 3.87; N, 4.14;
Cl, 20.96
Found: C, 56.77; H, 3.84; N, 4.03; Cl, 20.90

7-Chloro-1,3-dihydro-5-(p-methoxyphenyl)-2H-1,4-benzo-diazepine-2-one, m.p. 213°–214°, is made by the method of Example 1.

Anal. Calcd. for $C_{16}H_{13}ClN_2O_2$: C, 63.92; H, 4.36; N, 9.32
Found: C, 64.09; H, 4.50; N, 9.18

EXAMPLE 17

6-Bromo-2-chloromethyl-4-(p-chlorophenyl)quinazoline-3-oxide, m.p. 180°–181°, is made according to the preparation of the quinazoline in Example 12.

Anal. Calcd. for $C_{15}H_9BrCl_2N_2O$: C, 46.90; H, 2.36; N, 7.29;
Br, 20.81; Cl, 18.46
Found: C, 47.16; H, 2.35; N, 7.29; Br, 20.48; Cl, 18.17

7-Bromo-5-(p-chlorophenyl)-1,3-dihydro-2H-1,4-benzodiazepine-2-one-4-oxide, m.p. 260°–261°dec., is prepared according to Example 2.

Anal. Calcd. for $C_{15}H_{10}BrClN_2O_2$: C, 49.27; H, 2.76; Br, 21.86; Cl, 9.69; N, 7.66

Found: C, 49.29; H, 2.63; Br, 21.94; Cl, 9.74; N, 7.65

EXAMPLE 18

7-Chloro-1,3-dihydro-3-methyl-5-phenyl-2H-1,4-benzodiazepine-2-one-4-oxide, m.p. 268° dec., is prepared according to the general procedure of Example 2.

Anal. Calcd. for $C_{16}H_{13}ClN_2O_2$: C, 63.92; H, 4.36; Cl, 11.79; N, 9.32

Found: C, 64.20; H, 4.48; Cl, 11.59; N, 9.07

EXAMPLE 19

A solution of 2.4 g. of 1,3-dihydro-5-phenyl-2H-1,4-benzodiazepine-2-one in 100 ml. of ethanol is prepared by addition of alcoholic hydrogen chloride. The solution is shaken with hydrogen in the presence of 1 g. of 5 percent palladium-charcoal catalyst until one mole-equivalent of gas is consumed. The filtered solution is concentrated and the residue treated with acetonitrile to afford crystals of the hydrochloride of 1,3,4,5-tetrahydro-5-phenyl-2H-1,4-benzodiazepine-2-one, m.p. 247°. Upon treatment with sodium carbonate solution, the base, m.p. 145°–146°, is obtained.

Anal. Calcd. for $C_{15}H_{14}N_2O$: C, 75.60; H, 5.92; N, 11.76

Found: C, 75.74; H, 5.51; N, 11.72

EXAMPLE 20

To a solution of 2.87 g. of 7-chloro-1,3-dihydro-5-phenyl-2H-1,4-benzodiazepine-2-one-4-oxide in 30 ml. of water and 4 ml. of 4N sodium hydroxide is added with stirring 1 ml. of dimethyl sulfate. The 7-chloro-1,3-dihydro-1-methyl-5-phenyl-2H-1,4-benzodiazepine-2-one-4-oxide which precipitates out of the solution is collected and recrystallized from toluene to give a white solid, m.p. 178°–180°.

Anal. Calcd. for $C_{16}H_{13}ClN_2O$: C, 63.92; H, 4.36; N, 9.32; Cl, 11.76

Found: C, 63.67; H, 4.23; N, 9.38; Cl, 11.72

EXAMPLE 21

To a suspension of 150 g. of 7-chloro-1,3-dihydro-5-phenyl-2H-1,4-benzodiazepine-2-one-4-oxide in 400 ml. of chloroform is added dropwise a solution of 450 g. of phosphorus trichloride in 200 ml. of chloroform. The reaction is very exothermic with the oxide dissolving and then a yellow solid precipitating out. After all the phosphorus trichloride is added, the reaction mixture is refluxed for one-half hour, chilled and the yellow salt filtered. This is then dissolved in a mixture of alcohol and water, and the 7-chloro-1,3-dihydro-5-phenyl-2H-1,4-benzodiazepine-2-one precipitated by the addition of sodium carbonate solution. The m.p. is 212°–214° and this is the same compound as prepared in Examples 1 and 4.

It will be obvious to all skilled chemists that many changes can be made in the above-described examples without departing from the spirit of this invention. For example, though the reaction steps in which the seven-membered diazepine rings are formed are shown only as being conducted in alcoholic solutions, they may equally well be carried out in methanol, dioxane, ethylene or propylene glycol, lower alkyl glycol ethers such as ethylene glycol monomethyl ether, ethylene glycol monoethyl ether, etc.; in fact, any organic solvent which is substantially inert to the reactants employed and able to dissolve them to an appreciable extent may be employed. In some instances, better results may be obtained by employing solvents containing water, and accordingly the use of aqueous organic solvents is to be considered within the scope of this invention. Furthermore, though the conversion of the 2-(α-haloalkyl)quinazoline-3-oxides to the 1,3-dihydro-2H-1,4-benzodiazepine-2-one-4-oxides has been shown as being effected by alcoholic sodium hydroxide, any other strong base dispersed in a suitable organic solvent, including aqueous organic solvents, may be employed. Thus, potassium hydroxide in methyl alcohol may replace the sodium hydroxide in ethyl alcohol in the above reaction. Instead of palladium catalyst for the reduction of the 4-oxides to the 4-desoxy compounds, Adams' catalyst (platinum oxide) may be used.

We claim:

1. A compound of the formula:

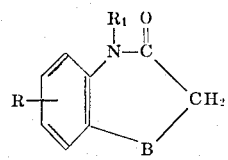

wherein B is a member of the group consisting of:

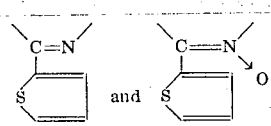

R is a member of the group consisting of hydrogen, chlorine and bromine; and $R_1$ is a member of the group consisting of hydrogen and lower alkyl.

2. 7-Chloro-1,3-dihydro-5-(2-thienyl)-2H-1,4-benzodiazepine-2-one-4-oxide.

3. A member selected from the group consisting of a compound of the formula

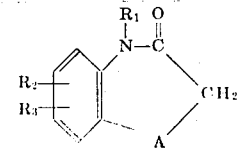

wherein $R_1$ is selected from the group consisting of hydrogen and lower alkyl; $R_2$ and $R_3$ are selected from the group consisting of hydrogen, chlorine, bromine, and methyl; and A is selected from the group consisting of

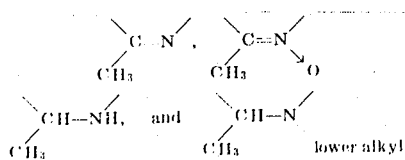

and the acid addition and quaternary ammonium salts thereof.

4. 1,3-Dihydro-5-methyl-2H-1,4-benzodiazepine-2-one-4-oxide.

5. 1,3-Dihydro-5-methyl-2H-1,4-benzodiazepine-2-one hydrochloride.

6. A compound of the formula

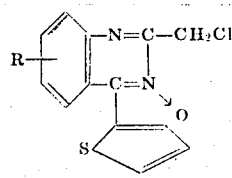

wherein R is selected from the group consisting of hydrogen, chlorine and bromine.

7. 6-Chloro-2-chloromethyl-4-(2-thienyl)-quinazoline-3-oxide.

8. A compound of the formula

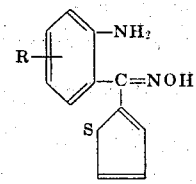

wherein R is selected from the group consisting of hydrogen, chlorine and bromine.

9. 2-Amino-5-chlorophenyl-2-thienyl ketone oxime.

10. A compound of the formula

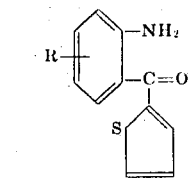

wherein R is selected from the group consisting of chlorine and bromine.

11. A compound of the formula

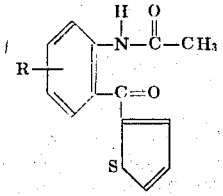

wherein R is selected from the group consisting of hydrogen, bromine and chlorine.

* * * * *